UNITED STATES PATENT OFFICE.

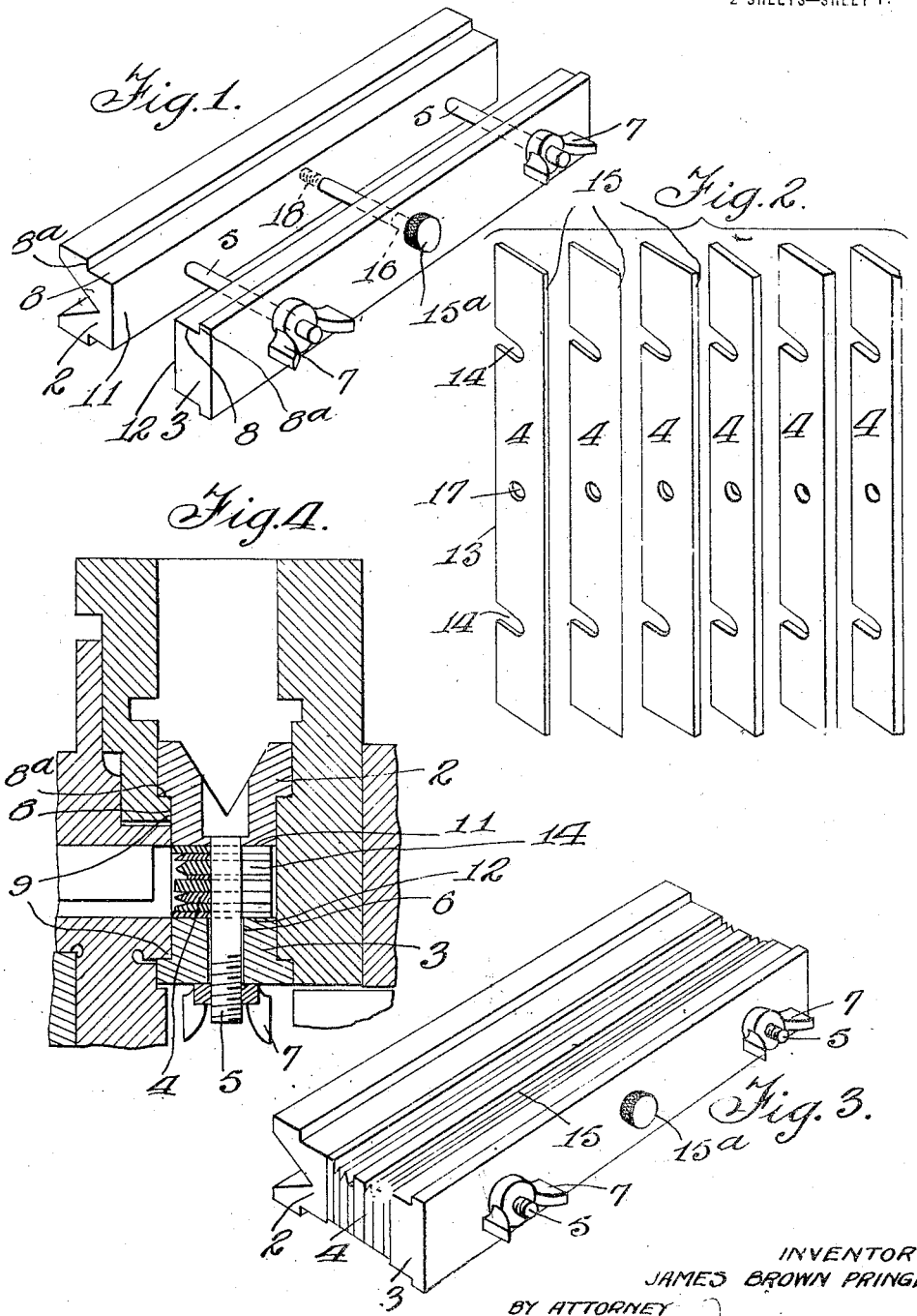

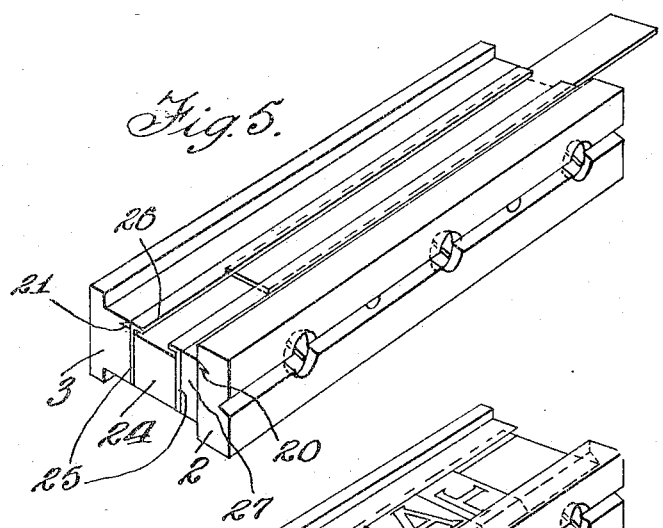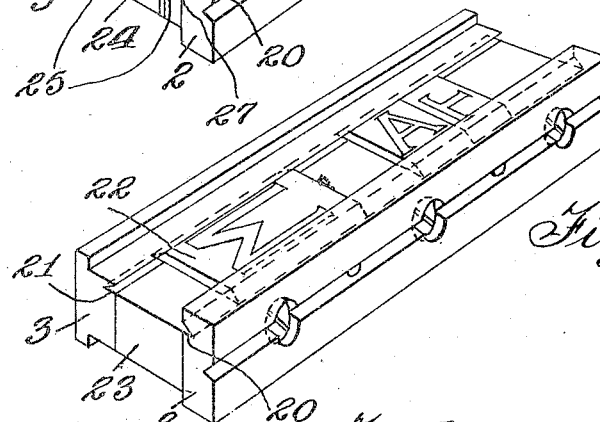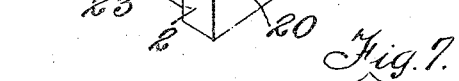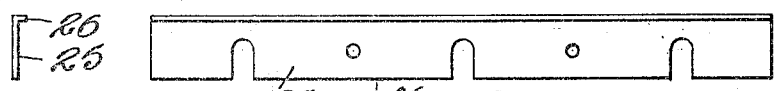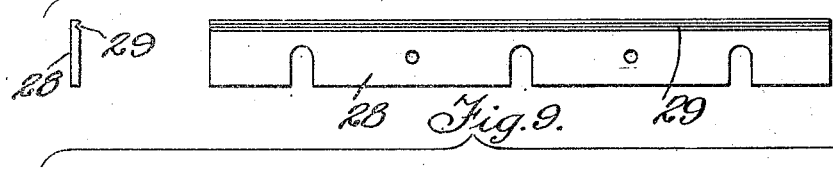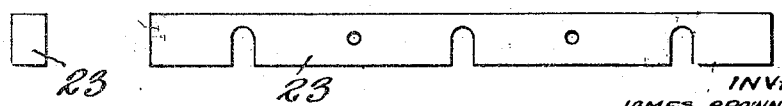

JAMES BROWN PRINGLE, OF MONTREAL, QUEBEC, CANADA.

MATRIX-BLOCK.

1,297,731.

Specification of Letters Patent.   Patented Mar. 18, 1919.

Application filed August 7, 1918.  Serial No. 248,799.

*To all whom it may concern:*

Be it known that I, JAMES BROWN PRINGLE, a subject of the King of Great Britain, and resident of the city of Montreal, Province of Quebec, Canada, have invented certain new and useful Improvements in Matrix-Blocks, and do hereby declare the following to be a full, clear, and exact description of same.

This invention relates to matrix blocks for use in connection with a machine wherein a slug is cast in a slotted mold against a matrix, the block, as distinguished from the series of individual matrices used to produce a slug for a line of type hitherto, consisting of a unitary block with a longitudinal groove cut in one side thereof for the reception of a strip or plate so faced as to constitute the matrix proper and being utilized more particularly for the production specially of slugs for the printing of rules, borders, dashes and the like.

For a period the matrix plates were made of a width to fill the groove in the block but as the use of such single matrix plate necessitated the manufacture of a new plate for each new slug face to be produced it was proposed to utilize a series of narrower matrix plates so that while a single formative plate could be used in conjunction with filler or spacer plates having blank faces, two or more formative matrix plates forming a composite matrix plate could be used in conjunction to produce a slug faced with a combination of the same or different rules or border formations without the necessity of manufacturing a new matrix plate, the units of the series of matrix plates being capable of repeated use in the various combinations required.

It has been found, however, that a unitary block is not suitable for use in conjunction with the above mentioned series of matrix plates owing to the fact that to insert the latter in the groove of the block a certain freedom or clearance between them and the walls of the groove is necessary. Therefore as the block is of unitary formation and the width of the groove consequently fixed a loose association of the plates with each other and with the walls of the groove results and spaces are established into which the molten metal flows during the casting operation and spoils the face of the slug.

Efforts have been made to overcome the mentioned disadvantage by the use of set screws for tightening the plates in the groove but these set screws do not provide an even bearing throughout the length of the plates and are therefore unsatisfactory for such reason and also because they require the use of a separate tool to set them and furthermore present, among other disadvantages apparent to those skilled in the art, the necessity for the matrix plates being held in position until engaged by the screws.

The object, therefore, of this invention is to provide a new and improved matrix block and especially one adapted to overcome the deficiencies of matrix blocks of prior design for use with composite matrix plates.

For full comprehension, however, of my invention reference should be had to the accompanying drawings forming a part of this specification, in which similar reference characters indicate the same parts and wherein:—

Figure 1 is a perspective view of the matrix block.

Fig. 2 illustrates certain of the series of matrix plates;

Fig. 3 is a perspective of the block and plates assembled;

Fig. 4 is a transverse section of the block and portions of the mold and elevator;

Fig. 5 is a perspective view of a modified form of matrix block showing its adaptability for use in connection with matrices of slide form.

Fig. 6 is a perspective view of the same form of matrix block as shown in Fig. 5 but with a single filler block adapting it for carrying large-type-letter matrices.

Fig. 7 presents side and end views of a retainer plate for use with slide matrices.

Fig. 8 presents side and end views of a modified form of retainer plate, and

Fig. 9 presents side and end views of a filler block for use with slide matrices.

The matrix block as shown in the accompanying drawings instead of being of a unitary character and grooved as formerly, is constructed in two main portions or blocks 2 and 3 adapted to be spaced apart to permit the ready insertion between them of what I term the interchangeable matrix forming element, or structure, which may consist at one time of a series of matrix plates and spacer plates, as shown in Figs. 3 and 4, or at another time be built up or composed of a filler block, retaining strips and slide, as shown in Fig. 5; or, composed of a filler block and slide only, as shown in Fig. 6; the block portions 2 and 3, after insertion of the matrix forming element, being forced toward each other to tightly hold the inserted parts in place.

The block portion 2 is provided with connecting posts 5 which may be in the form of screws passed through and projecting from such block portion 2 and being screw-threaded at their outer ends, while the block portion 3 has holes 6 therethrough enabling it to be slidably mounted upon the connecting posts, and thumb nuts 7 or the like are screwed upon the outer ends of the posts and bear against the outer side of block portion 3.

As shown in Figs. 1, 3 and 4 the opposite side faces of the block portions 2 and 3 are flush with each other and correspondingly scarfed at 8 to provide shoulders 8ᵃ for engagement with the mold 9 as will be apparent from Fig. 4. The opposing faces 11 and 12 respectively of the block portions 2 and 3 are preferably flat and the matrix plates 4 have open ended slots 14 formed in one edge 13 to fit over or straddle the posts 5, the dimensions of the slots being such as to position the plates with their opposite character-bearing edges 15 in correct relation to the flush faces of the block portions and prevent displacement of the plates longitudinally of the block.

The series of plates 4, certain of which are shown in the drawings to indicate their employment, can be made to include all formations likely to be required and while a single plate may be used in conjunction with the block portions, a number also can be used together to secure a desired combination, while spacer plates which when in position have their working faces flush with the scarfed surfaces of the block portions, can be employed as fillers when necessary.

The block portions 2 and 3 are spread sufficiently far apart prior to the insertion of the part or parts of the matrix forming element to enable the latter to be readily dropped over the posts and when such parts are dropped into position the clearance between them and the block portion is taken up by turning the thumb nuts and so moving portion 3 toward portion 2 to clamp the plates between them. The clamping action is evenly transmitted by block portion 3 throughout the length of the block and such even tightening of the inserted parts avoids spaces or cracks across the matrix which if present would cause a faulty casting when the block is brought into casting position as shown in Fig. 4.

As a safeguard to prevent any possibility of the matrix plates or other inserted parts being accidentally displaced suitable locking means are provided such as pins 15ᵃ having screw threaded ends which may be passed through holes 16 in block portion 3, and corresponding registering holes 17 in the matrix plates and be screwed into screw threaded holes 18 in the other block portion 2.

On reference to Figs. 5 and 6 it will be noticed that the block portion 2 instead of being substantially deep in cross section, scarfed to provide the necessary shoulders and having the usual deep and wide V-shaped operating groove in its top side, is of a comparatively shallow oblong cross section provided with a correspondingly restricted V-shaped operating groove, and has a dove-tail groove 20 in its underside near the front edge extending the full length of the block portion as indicated by dotted lines.

This shallow form of block portion, the front and back side edges of which constitute the shoulders requisite for operation in the machine in which it is used, results in greater working space between the block portions and consequently a greater variety of matrices can be used while with a dove-tail groove 21 in the block portion 3 corresponding to that 20 in block portion 2, the comparatively large bevel edged sliding letter matrices 22 shown in Fig. 6 can be used.

When as shown in Figs. 5 and 6 slide matrices are used the space between the block portions can be filled with either the single large bearer, or filler, block 23 separately shown in Fig. 9 and in place in Fig. 6, or, as in Fig. 5 with a bearer block 24, and two retainer plates 25, (one of which is illustrated in Fig. 7) having the turned over edges 26 to form with the block 24 guideways for a thin narrow matrix slide, which may if desired be of papier mâché, the remaining space being filled by a filler plate 27.

For use with narrow matrix slides having beveled edges retainer plates 28 grooved as at 29 may be used.

As a result of the even and tight association of the matrix forming element with the block and the facility with which the parts can be dropped into position, matrix plates made of cardboard or other inexpensive and readily worked up material can be employed.

What I claim is as follows:

1. In a matrix holder for use in casting printing slugs, the combination of two block portions, posts permanently carried by and projecting from one block portion and passing through and beyond holes in the other block portion, the block portions presenting opposing faces of like formation throughout their length and adapted to be spaced apart to permit the ready insertion of a matrix forming element between them, and means on the ends of the posts for tightening the block portions upon and holding the matrix forming element.

2. In a matrix holder for use in casting printing slugs, the combination of two block portions adapted to be spaced apart to permit the ready insertion of a matrix forming element between them and presenting opposing faces adapted to bear upon said element; a plurality of connections between the block portions; a matrix forming element formed with slots in one of its edges, and locking means for preventing displacement of the matrix forming element.

3. In a matrix holder for use in casting printing slugs, the combination of two block portions adapted to be spaced apart to permit the ready insertion of a matrix forming element between them and presenting opposing faces adapted to bear upon said element; a plurality of connections between the block portions; a matrix forming element formed with a hole therethrough and slots in one of its edges, and a retaining pin passed through one block portion through the hole in said element and connected with the other block portion.

4. In a matrix holder for use in casting printing slugs, the combination of two block portions, posts permanently carried by and projecting from one block portion and passing through and beyond holes in the other block portion, the block portions presenting opposing faces of like formation throughout their length and adapted to be spaced apart to permit the ready insertion of a matrix forming element between them; a composite matrix forming element inserted between the block portions; and means on the ends of the posts for moving the block portions toward each other and holding same in closed position upon the matrix forming element.

5. In a matrix holder for use in casting printing slugs, the combination of two block portions adapted to be spaced apart to permit the ready insertion of a composite matrix forming element between them; a composite matrix forming element comprising a filler block, retaining strips and a matrix slide inserted between the two block portions; and means for moving the block portions toward each other and holding same in closed position upon the matrix forming element.

6. In a matrix holder for use in casting printing slugs, the combination of two block portions adapted to be spaced apart to permit the ready insertion of an interchangeable composite matrix forming element between them; a composite matrix forming element comprising a filler block, retaining strips and a matrix slide, such element having holes therethrough and slots in one edge, and inserted between the block portions; a plurality of connections between the block portions for moving them toward each other, and retaining pins extending between the block portions and passing through the holes in the matrix forming element.

7. In combination a matrix holder for use in casting printing slugs, comprising two block portions adapted to be spaced apart to permit the ready insertion of matrix forming elements edge-on between them and to be forced toward each other to tightly hold said elements in place, a plurality of connections between the block portions, and matrix forming elements formed with slots in one edge to register with and accommodate said connections, said slots being of such a depth with relation to the opposite character-bearing edge of the matrix forming element that the contacting of the bottoms thereof with said connections will insure the proper positioning of such character-bearing edge with relation to the block portions for the casting operation.

8. A matrix holder, for use in casting printing slugs, comprising two block portions adapted to be spaced apart to permit the ready insertion of matrix forming elements between them and presenting opposing bearing faces between which the matrix forming elements are to be held, a plurality of posts extending from the bearing face of one block portion and having their ends screw-threaded, the other block portion provided with holes through which the screw-threaded ends of the posts may pass, and thumb nuts on such screw threaded ends for moving the last mentioned block portion toward the other block portion.

9. In means for use in casting printing slugs, the combination with a matrix holder comprising two block portions adapted to be spaced apart and presenting opposing bearing faces between which the matrix elements are to be held, a plurality of posts extending from the bearing face of one block portion and having their ends screw-threaded, the other block portion provided with holes through which the screw-threaded ends of the posts may pass and thumb nuts on such screw threaded ends for moving the last mentioned block portion toward the other block portion,—of a matrix element adapted to be held between the bearing faces of the block portions one edge of the element presenting the desired character formation to be cast and the opposite edge being slotted from such edge inward at points to register with and accommodate the posts extending between such block portions.

10. In a matrix holder for use in casting printing slugs, the combination of two block portions adapted to be spaced apart to permit the ready insertion of a matrix forming element between them, a plurality of posts projecting from one block portion and the other block portion presenting holes for the passage freely therethrough of the ends of said posts, means for positioning and retaining a matrix forming element in place, and means for tightening the block portions upon and holding the matrix forming element.

11. In a matrix holder for use in casting printing slugs, the combination of two block portions adapted to be spaced apart to permit the ready insertion of a matrix forming element between them, a plurality of posts having screw-threaded ends projecting from one block portion and the other block portion presenting holes for the passage freely therethrough of the ends of said posts, pins for positioning and retaining a matrix forming element in place and thumb nuts on the screw-threaded ends of the posts for tightening the block portions upon and holding the matrix forming element.

JAMES BROWN PRINGLE.